(12) United States Patent
O'Neill et al.

(10) Patent No.: US 9,261,313 B2
(45) Date of Patent: Feb. 16, 2016

(54) METHOD AND SYSTEM FOR CONTROLLING A HEAT TRANSFER APPARATUS

(71) Applicant: Carleton Saunders, Mendham, NJ (US)

(72) Inventors: Tom O'Neill, Nashville, TN (US); Carleton Saunders, Mendham, NJ (US)

( * ) Notice: Subject to any disclaimer, the term of this patent is extended or adjusted under 35 U.S.C. 154(b) by 238 days.

(21) Appl. No.: 13/847,484

(22) Filed: Mar. 20, 2013

(65) Prior Publication Data

US 2014/0284042 A1    Sep. 25, 2014

(51) Int. Cl.
*F28F 27/00* (2006.01)
*B23P 15/26* (2006.01)
*F28F 9/00* (2006.01)

(52) U.S. Cl.
CPC ............... *F28F 27/00* (2013.01); *B23P 15/26* (2013.01); *F28F 9/00* (2013.01); *Y10T 29/4935* (2015.01)

(58) Field of Classification Search
CPC ....... G01N 25/18; G01N 27/18; G01N 30/66; H01C 1/02; Y10T 29/4935; F28F 9/00; F28F 27/00; B23P 15/26
USPC .......................................................... 165/76
See application file for complete search history.

(56) References Cited

U.S. PATENT DOCUMENTS

| | | | | |
|---|---|---|---|---|
| 7,934,868 | B2 * | 5/2011 | Kubota et al. | 374/43 |
| 8,137,625 | B2 * | 3/2012 | Sasanuma et al. | 422/82.02 |
| 8,763,411 | B2 * | 7/2014 | Wray et al. | 62/67 |
| 2002/0135454 | A1 * | 9/2002 | Ichida et al. | 338/25 |
| 2012/0244608 | A1 * | 9/2012 | Selker et al. | 435/288.7 |

* cited by examiner

*Primary Examiner* — Michael Zarroli

(57) ABSTRACT

A method of controlling a heat transfer apparatus comprising the steps of: providing a heat transfer apparatus; providing a control apparatus comprising a thermal sensor configured to control operation of the heat transfer apparatus; providing a casing comprising a casing wall enclosing a casing chamber, a casing entrance, and a casing seal; and inserting the thermal sensor into the casing chamber through the casing entrance an aperture in the casing seal.

20 Claims, 3 Drawing Sheets

METHOD AND SYSTEM FOR CONTROLLING A HEAT TRANSFER APPARATUS

FIELD OF THE INVENTION

The present invention relates to a method and system for controlling a heat transfer apparatus and, more particularly, to an a method and system for increasing the operational efficiency of the heat transfer apparatus.

BACKGROUND OF THE INVENTION

Since the early 1800s, first generation refrigeration systems have accomplished heat exchange via a vapor compressor controlled by a thermostat receiving air temperature data from inside the refrigeration cabinet via a thermal sensor. This is problematic because the ultimate goal of the refrigeration system is to maintain product temperature, and air temperature fluctuates much more rapidly than product temperature, thus creating creating premature compressor starts and stops. These premature compressor starts and stops create unnecessarily high fluctuations in product temperature, increase mechanical shock on the system, and create significant energy waste.

SUMMARY OF THE INVENTION

According to one embodiment of the present invention, there is a method of controlling a heat transfer apparatus comprising the steps of: providing a heat transfer apparatus; providing a control apparatus comprising a thermal sensor configured to control operation of the heat transfer apparatus; providing a casing comprising a casing wall enclosing a casing chamber, a casing entrance, and a casing seal; inserting the thermal sensor into the casing chamber through the casing entrance and an aperture in the casing seal.

In one aspect, the casing is configured to cause the air temperature in the casing chamber to substantially mimic a product temperature. In another aspect, the casing seal is configured to substantially prevent air from flowing into the casing chamber. In another aspect, the aperture in the casing seal is stretchable so that the casing seal is configured to receive a first thermal sensor of a first diameter at a first time and a second thermal sensor of a second diameter different than the first diameter at a second time. In another aspect, the casing wall comprises a casing seat having an inside dimension greater then an inside dimension of the casing chamber, and wherein the casing seal is seated in the casing seat. In another aspect, the casing comprises a fluid chamber enclosed between an inner casing wall and an outer casing wall. In another aspect, the casing wall is further configured to have a substantially uniform thickness. In another aspect, the casing further comprises a casing cap configured to prevent the casing seal from becoming dislodged during thermal sensor extraction.

In another aspect, the method further comprises removing the thermal sensor through the aperture in the casing seal; inserting a second thermal sensor through the aperture in the casing seal; wherein the casing seal retains its ability to substantially prevent air flow through the aperture of the casing seal. In another aspect, the fluid chamber is further configured to comprise a fluid that is configured to cause the air temperature in the casing chamber to substantially mimic a product temperature.

In another embodiment of the present invention, there is a system for transferring heat, comprising: a casing wall enclosing a casing chamber that is closed at one end; a casing entrance at another end of the casing; a casing cap removably connected to the casing wall at the casing entrance; and a casing seal connected between the casing cap and the casing wall at the casing entrance, the casing seal comprising a compressible material and an aperture passing through the compressible material.

In another aspect, the system further comprises a casing comprising a casing seat having an inside dimension greater than an inside dimension of the casing chamber, and wherein the casing seal is seated in the casing seat. In another aspect, the system further comprises a thermal sensor located inside the casing and connected to a thermal sensor connection passing through the aperture in the casing seal, wherein the casing seal is configured to substantially prevent the flow of air through the aperture of the casing seal. In another aspect, the system further comprises a control apparatus connected to and configured to receive information from the thermal sensor via the thermal sensor connection. In another aspect, the system further comprises a heat transfer apparatus connected to and configured to be controlled by the control apparatus based at least in part on the temperature information. In another aspect of the system, the casing wall comprises plastic having a thickness of between approximately 1 mm and 15 mm. In another aspect of the system, the thermal sensor is substantially not in contact with the casing wall. In another aspect of the system, the casing seal comprises a silicone foam. In another aspect, the silicone foam is further configured to be a closed-cell silicone foam.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DETAILED DESCRIPTION

In the following description, the use of "a," "an," or "the" can refer to the plural. All examples given are for clarification only and are not intended to limit the scope of the invention.

Figure 1:
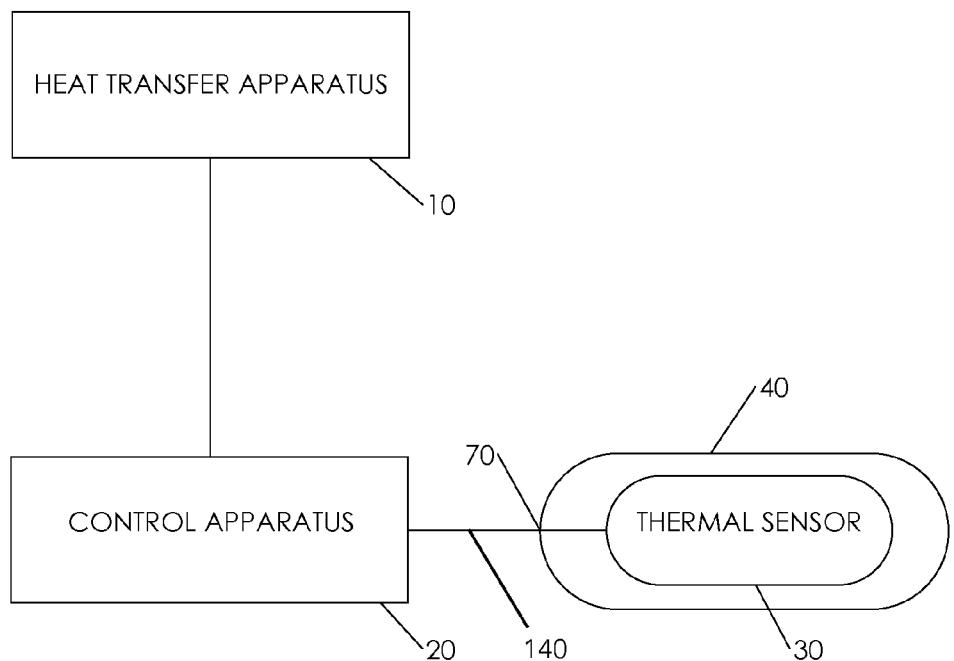
FIG. 1 is a diagrammatic view of a heat transfer apparatus with thermal sensor inserted into a casing.

FIG. 1 is a diagrammatic view of a heat transfer apparatus 10 controlled by a control apparatus 20 comprising a thermal sensor 30. The heat transfer apparatus 10 may comprise any device or system known in the art for moving or transferring heat, including but not limited to a refrigerator, air conditioner, freezer, heat pump, etc. In the embodiment described herein, heat transfer apparatus 10 may comprise a refrigerator having, for example, an enclosed fluid conduit, a working medium within the conduit, a fluid pump, a condenser, and an evaporator. Control apparatus 20 may comprise any device, system, processor, or computer that is known in the art and is configured, through any means known (such as via mechanical components, electrical components, hydraulics, pneumatics, etc.), to control a heat transfer apparatus 10. In the embodiment described herein, control apparatus 20 may comprise a mechanical or electronic thermostat electronically connected to the heat transfer apparatus 10. Thermal sensor 30 may comprise any device or apparatus configured to sense heat and/or temperature that is known in the art. For example, thermal sensor 30 may comprise thermal sensor connection 140 further comprising a mechanical copper bulb sensing element connected to the control apparatus 20 via a capillary tube. Thermal sensor 30 may also comprise a thermal sensor connection 140 further comprising a digital sensing element connected to the control apparatus 20 via electrical wire.

In this view in FIG. 1, the thermal sensor 30 has been inserted into a casing 40 through a casing entrance 70 which may create a product temperature simulating thermal barrier around the thermal sensor 30 that simulates or substantially matches a temperature of a product whose temperature aims to be sensed by the thermal sensor 30. The casing 40 may be configured to comply with industry standards for mimicking product temperature, such as the NSF P235 protocol.

In one embodiment, the present invention may comprise machine-readable instructions located on a storage medium and configured to interface with the control apparatus 20 and to receiving air temperature data from the thermal sensor 30. The machine-readable instructions may be configured to analyze air temperature data according to a moving average algorithm configured to simulate or substantially match a temperature of a product whose temperature aims to be sensed by the thermal sensor 30 and to calculate a simulated product temperature. The control apparatus 20 comprising the machine-readable instructions may then be configured to control the heat transfer apparatus 10 according to the simulated product temperature.

Figure 2:
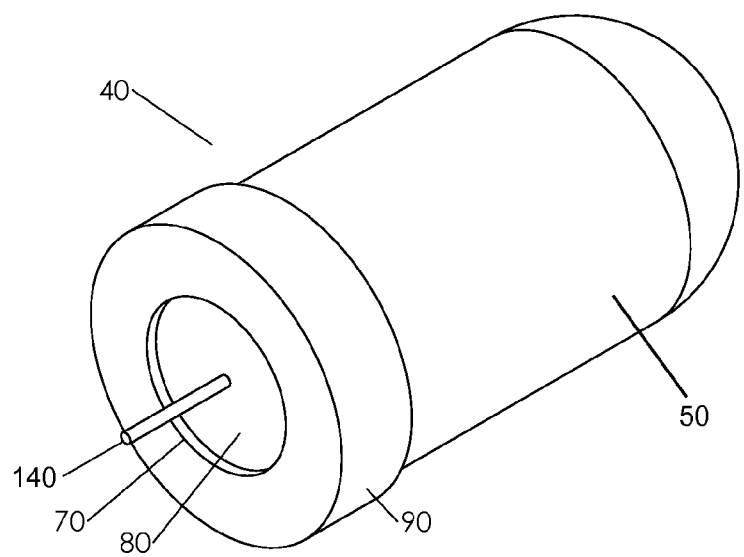
FIG. 2 is a perspective view of a casing according to one embodiment of the present invention.
Figure 3:
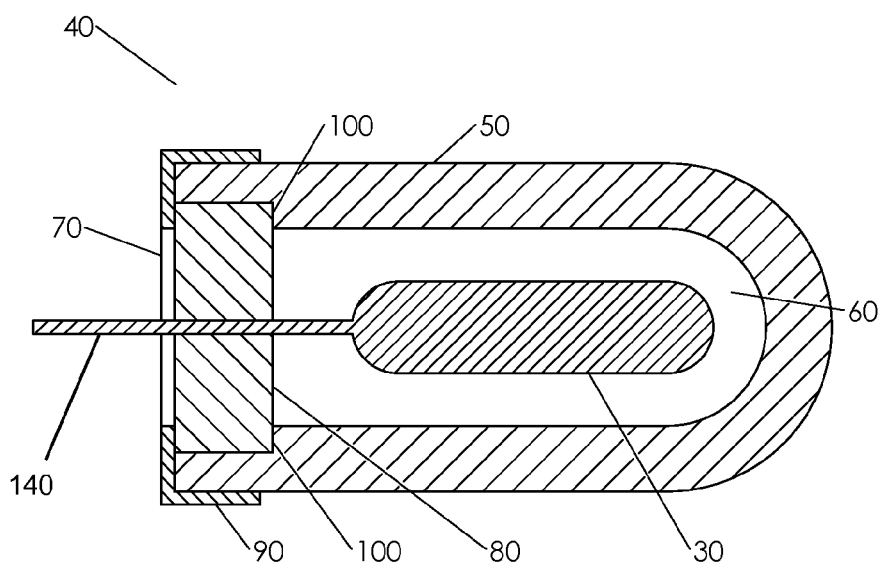
FIG. 3 is a side view of a casing according to one embodiment of the present invention.

Referring now to FIGS. 2 and 3, casing 40 comprises a casing entrance 70, a casing wall 50, a casing seal 80, a casing cap 90 and a casing chamber 60. In one embodiment, the casing seal 80 is seated against a casing seat 100 to prevent the casing seal 80 from being pushed into the casing chamber 60 during insertion of the thermal sensor 30. Likewise, the casing cap 90 may also be designed to prevent the casing seal 80 from being dislodged during extraction of the thermal sensor 30.

Casing wall 50 may have an approximately cylindrical shape with one open end and one closed end (which may be rounded), although it is not limited to this shape, and could instead having any other shape, such as an extruded square, rectangle, oval, etc. The casing wall 50 may be shaped and configured to receive and accommodate the thermal sensor 30 inside casing chamber 60. The casing wall 50 may have a thickness of between approximately 1 mm and 15 mm, which may or may not be substantially uniform. For instance, the casing wall 50 may have a thickness near the casing entrance 70 that is greater or less than a thickness opposite the casing entrance 70. In one embodiment, the casing 40 is configured such that the thermal sensor 30 is substantially not in contact with the casing wall 50.

The casing seal 80 may be made from any number of compressible materials designed to accommodate a thermal sensor 30 and substantially prevent airflow into the casing chamber 60 by creating a seal around the thermal sensor connection 140. In one embodiment, the casing seal 80 is made of closed-cell silicone foam with a central aperture to allow insertion of the thermal sensor 30. In another embodiment, the casing seal 80 is stretchable so that the casing seal 80 is configured to receive a first thermal sensor 30 of a first diameter at a first time and a second thermal sensor 30 of a second diameter different than the first diameter at a second time, without losing its ability to prevent substantially all air flow from passing through the aperture of the casing seal 80.

Casing seat 100 may comprise a groove or cut-out in the casing wall 50 that has a dimension larger than an inside dimension of the casing wall 50 and a dimension smaller than an outside dimension of the casing wall 50, so that a thickness of material surrounding the casing seat 100 is less than a thickness of the casing wall 50, such as between 0.5 mm and 7 mm. Casing seat 100 has an inside dimension approximately equal to an outside dimension of casing seal 80, discussed as follows, so that casing seal 80 can rest inside and seal off the casing chamber 60 without being able to slide beyond casing seat 100. In one embodiment, the casing seal 80 may be configured to have a slightly larger dimension which may create a more effective seal against the thermal sensor connection 140.

The casing wall 50 may comprise any rigid solid that can contain the thermal sensor 30 as well as conduct heat to and from the casing chamber 60, such as (but not limited to), plastic, metal, ceramics, and composite materials. The casing wall 50 has one purpose of transferring heat sufficiently slowly that the air inside casing chamber 60 has a temperature representing a moving average of the temperature in the substance or environment whose temperature is being probed. In other words, the casing wall 50 may damp sharp fluctuations in the environmental temperature, so that the control apparatus 20 does not over react to changes in the environmental temperature. One aspect of the present invention includes providing different materials, dimensions, and wall thicknesses of casing wall 50 so as to achieve the desired response time between environmental temperature and temperature sensed by the thermal sensor 30.

In one embodiment, the casing wall 50 is configured to allow the air inside the casing chamber 60 to substantially mimic product temperature. The casing wall 50 may be made from a number of materials, but preferably an impact-resistant plastic that is configured to be safe for use near food.

The casing chamber 60 and casing entrance 70 may be of any diameter and length configured to allow a thermal sensor 30 to be housed in the casing chamber 60, such as at least approximately 5 mm in diameter and approximately 60 mm in length to accommodate a digital thermal sensor 30, and at least approximately 10 mm in diameter and approximately 90 mm in length to accommodate a mechanical thermal sensor 30. The length of the casing chamber 60 may be configured to In one embodiment, the casing wall 50 and casing seal 80 may be configured to create a substantially uniform thermal barrier around the thermal sensor 30, which may ensure that the air temperature inside the casing chamber 60 is not asymmetrically influenced by the ambient temperature.

Figure 4:
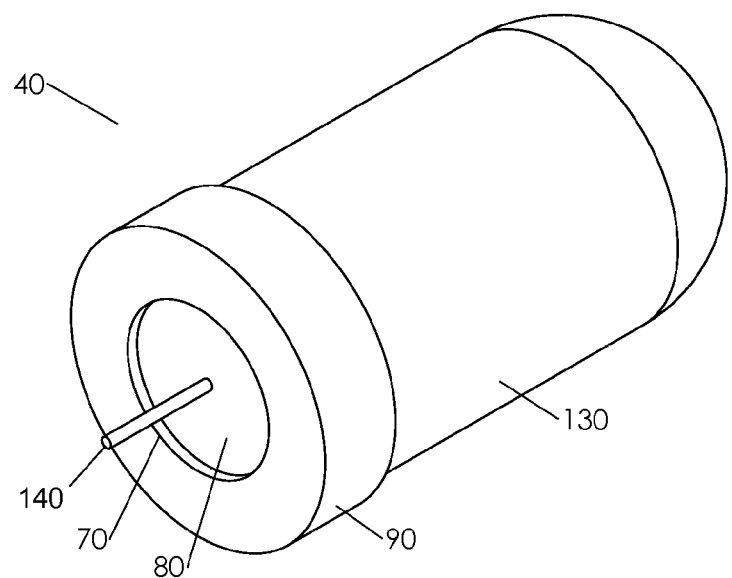
FIG. 4 is a perspective view of a casing according to another embodiment of the present invention.
Figure 5:
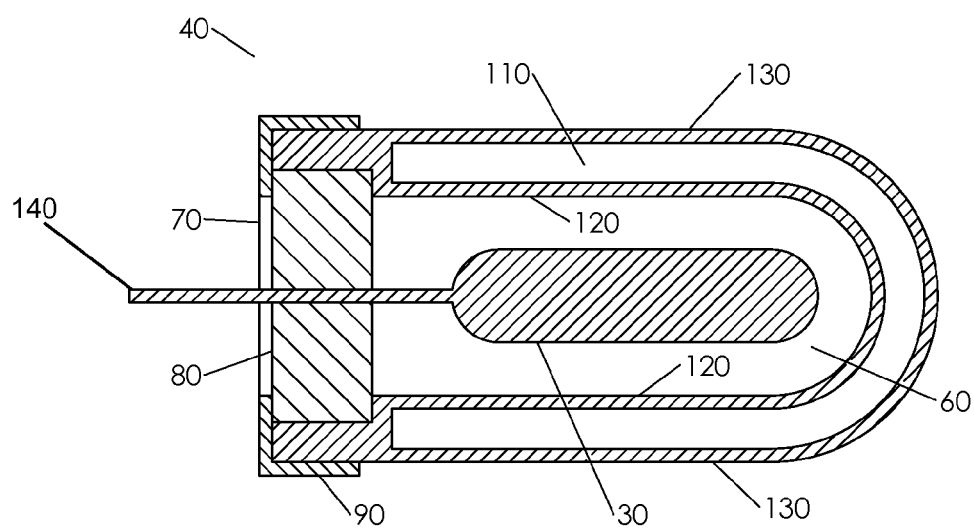
FIG. 5 is a side view of a casing according to another embodiment of the present invention.

Referring now to FIGS. 4 and 5, casing 40 comprises a casing entrance 70, an inner casing wall 120, an outer casing wall 130, a casing seal 80, a casing cap 90, a casing chamber 60, and a fluid chamber 110. Fluid chamber 110 may be configured to hold a variety of fluids which may be configured to simulate or substantially match a temperature of a product whose temperature aims to be sensed by the thermal sensor 30.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

We claim:

1. A method of controlling a heat transfer apparatus comprising the steps of:
   providing a control apparatus comprising a thermal sensor configured to control operation of the heat transfer apparatus;
   providing a casing comprising a casing wall enclosing a casing chamber, a casing entrance, and a casing seal;
   inserting the thermal sensor into the casing chamber through the casing entrance and an aperture in the casing seal; and
   controlling operation of the heat transfer apparatus with the control apparatus;
   wherein the aperture retains an ability to remove and reinsert the thermal sensor and substantially prevent air inflow with the thermal sensor inserted.

2. The method as claimed in claim 1, wherein the casing is configured to cause an air temperature in the casing chamber to substantially mimic a product temperature.

3. The method as claimed in claim 1, wherein the aperture in the casing seal is stretchable.

4. The method as claimed in claim 1, wherein the casing wall comprises a casing seat wherein the casing seal is seated in the casing seat.

5. The method as claimed in claim 1, wherein the casing further comprises a fluid chamber within the casing wall.

6. The method as claimed in claim 1, further comprising the steps of: removing the thermal sensor through the aperture in the casing seal and inserting a second thermal sensor through the aperture in the casing seal; wherein the casing seal retains an ability to substantially prevent air flow through the aperture of the casing seal.

7. The method of claim 5, wherein the fluid chamber is further configured to comprise a fluid that is configured to cause the air temperature in the casing chamber to substantially mimic a product temperature.

8. The method of claim 1 wherein the thermal sensor is surrounded by a substantially uniform thermal barrier.

9. A heat transfer apparatus control component comprising:
   a casing wall enclosing a casing chamber that is closed at one end;
   a casing fluid chamber within the casing wall;
   a casing entrance at another end of the casing chamber;
   a casing cap connected to the casing wall at the casing entrance; and
   a casing seal connected between the casing cap and the casing wall at the casing entrance, the casing seal comprising a compressible material and an aperture passing through the compressible material;
   wherein the aperture retains an ability to remove and reinsert a thermal sensor and substantially prevent air inflow with the thermal sensor inserted.

10. The component of claim 9 wherein the casing fluid chamber contains a fluid.

11. The component of claim 10 wherein the fluid is configured to cause an air temperature in the casing chamber to substantially mimic a product temperature.

12. The component of claim 9 further comprising a thermal sensor located inside the casing chamber and connected to a thermal sensor connection passing through the aperture.

13. The component as of claim 12 further comprising a control apparatus connected to and configured to receive information from the thermal sensor via the thermal sensor connection.

14. The component of claim 13 further comprising a heat transfer apparatus connected to and controlled by the control apparatus.

15. The method of claim 1 further comprising the step of providing a heat transfer apparatus.

16. The component of claim 9 further comprising a casing seat wherein the casing seal is seated in the casing seat.

17. The component of claim 9 wherein the thermal sensor is not in contact with the casing wall.

18. The component of claim 9 wherein the thermal sensor is surrounded by a substantially uniform thermal barrier.

19. The component of claim 9 further comprising a casing cap configured to prevent the casing seal from becoming dislodged.

20. The component of claim 9 wherein the casing seal substantially prevents air from flowing into the chamber.

* * * * *